M. A. TUCKER.
DIRIGIBLE HEADLIGHT.
APPLICATION FILED MAY 19, 1919.
1,352,394.
Patented Sept. 7, 1920.
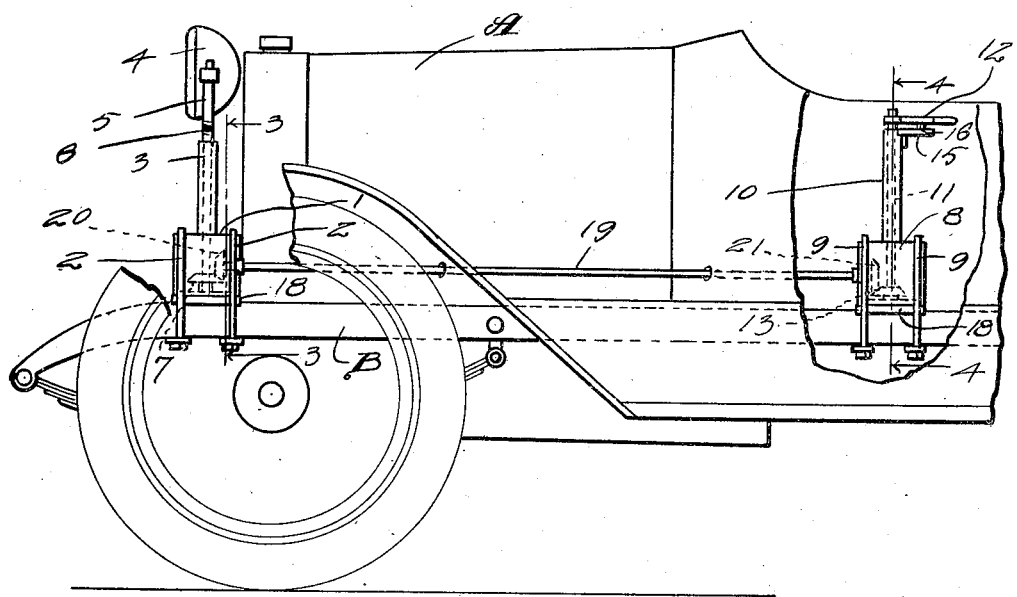
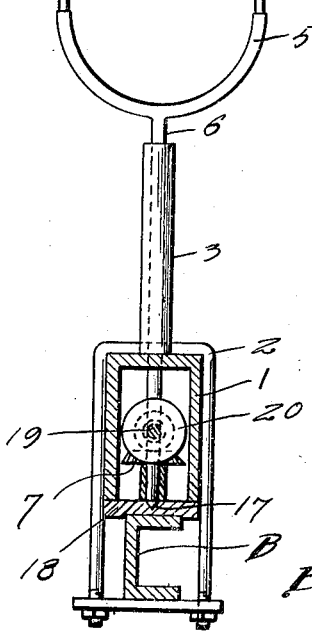
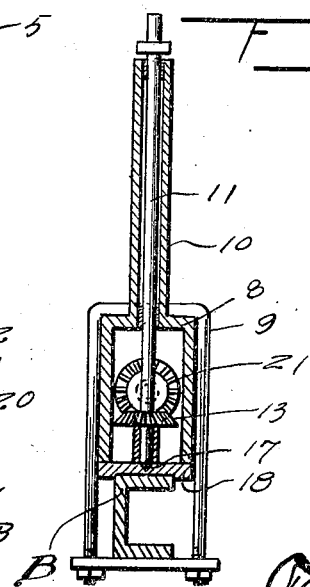
Inventor
M. A. Tucker.
By [signature], Atty.

UNITED STATES PATENT OFFICE.

MAT A. TUCKER, OF MOORE, OKLAHOMA, ASSIGNOR OF ONE-THIRD TO CHAS. L. TUCKER, OF MOORE, OKLAHOMA.

DIRIGIBLE HEADLIGHT.

1,352,394.    Specification of Letters Patent.    Patented Sept. 7, 1920.

Application filed May 19, 1919. Serial No. 298,042.

*To all whom it may concern:*

Be it known that I, MAT A. TUCKER, a citizen of the United States, residing at Moore, in the county of Cleveland and State of Oklahoma, have invented certain new and useful Improvements in Dirigible Headlights; and I do hereby declare the following to be a full, clear, and exact description of the invention, such as will enable others skilled in the art to which it appertains to make and use the same.

The invention relates to spotlights or headlights for automobiles and the like and has for its object the provision of means for mounting a headlight at the front of the automobile and controlling the light from the driver's seat.

The invention will be described in detail hereinafter and illustrated in the accompanying drawings in which—

Figure 1 is a side view of an automobile showing my improved headlight mounted thereon, Fig. 2, a detail view of lamp support, Fig. 3, a similar view of the operating mechanism support, and Fig. 4 a top plan view of the controlling mechanism.

In the drawings similar reference characters will be used to designate corresponding parts in the several views. A indicates an automobile on which my improved headlight is shown to be installed.

The lamp support consists of a housing 1 secured by means of shackles 2 to the side beam B of the frame of the automobile, and having an integral upright tubular extension 3. The lamp 4 is mounted in U-shaped bracket 5 on the upper end of vertical shaft 6 journaled in tubular extension 3, the lower end of said shaft having a beveled gear pinion 7 secured thereto.

The operating mechanism is mounted in a support that is constructed similarly to the support for the lamp with a housing 8 secured by shackles 9 to side beam B and having an integral upright tubular extension 10. 11 indicates a shaft journaled in said tubular extension and having an operating lever 12 pivotally mounted thereon to actuate said shaft, 13 indicating a beveled pinion secured to the lower end of the shaft.

15 indicates a plate secured to the upper end of tubular extension 10 and having spaced lugs 16 on its upper face between which the lever 12 rests to normally hold the lamp 4 in position to throw the light therefrom straight forward. The lower ends of shafts 6 and 11 are supported in recesses 17 in base plates 18 secured under housings 1 and 8.

19 indicates a horizontal shaft connecting housings 1 and 8 and journaled in the walls thereof, and 20 and 21 beveled pinions secured to said shaft and meshing with pinions 7 and 13 respectively.

It will be understood that when the device is in such a position that lever 12 rests between lugs 16 on plate 15 the lamp's rays will shine directly to the front. When it is desired to direct the rays to the right or left the lever 12 will be lifted from engagement with lugs 16 and moved in the direction corresponding with the desired direction of the lamp's rays and the lamp will be rotated by means of shafts 6, 11 and 19 and the beveled pinions secured thereto.

Having thus described my invention what I claim is:—

In a dirigible headlight, housings secured to the frame of an automobile, a base plate located beneath each housing, a tubular extension mounted on each housing and extending vertically upward, a shaft journaled in each housing and having a pointed lower end seated in a recess in the base plate aforesaid, one of said shafts being formed to receive and support a lamp, an operating handle secured to the other shaft, a horizontal shaft connecting said housings and journaled in their walls, a beveled gear wheel secured on each end of said horizontal shaft within the housing, and a beveled gear wheel on each vertical shaft and meshing with the gear wheel on the adjacent end of the horizontal shaft.

In testimony whereof I affix my signature in presence of two witnesses.

MAT A. TUCKER.

Witnesses:
J. M. REED,
F. G. BABB.